April 6, 1926.
H. KOCH ET AL
1,579,369
BATTERY CARRIER AND CONNECTER
Filed August 23, 1921
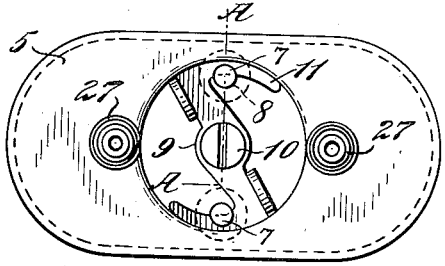
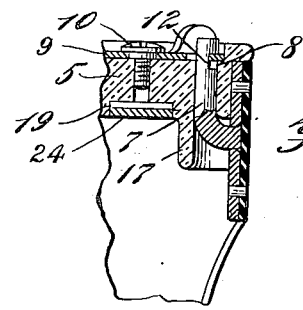
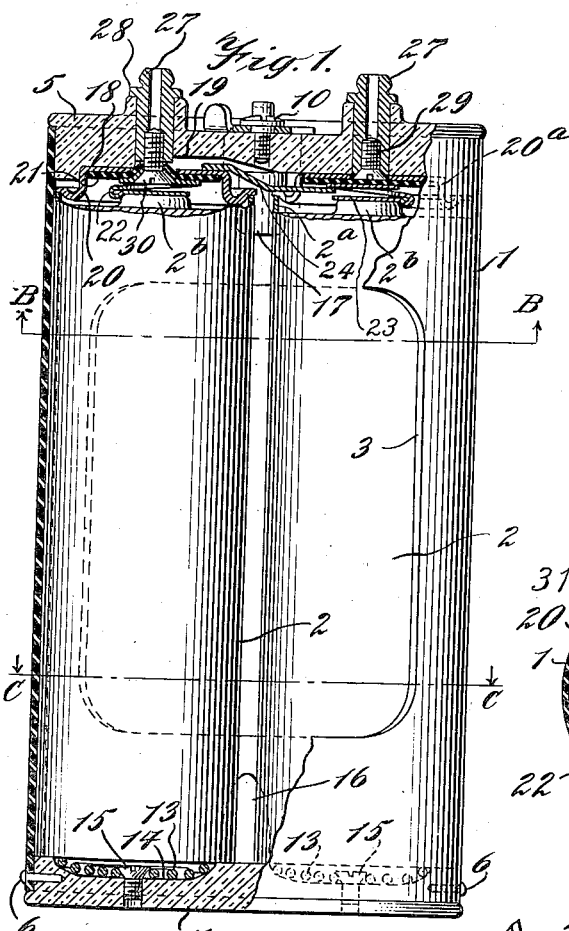
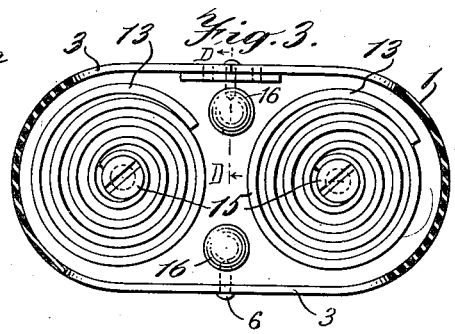
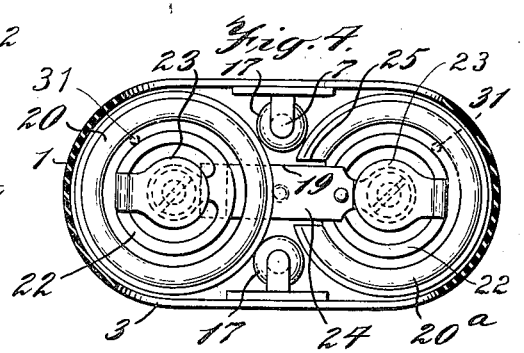

Patented Apr. 6, 1926.

1,579,369

UNITED STATES PATENT OFFICE.

HENRY KOCH AND FRIEDRICH H. N. WOHLERS, OF JAMAICA, NEW YORK, AND WILLIAM NAGLEY, OF RAHWAY, NEW JERSEY, ASSIGNORS TO DICTOGRAPH PRODUCTS CORPORATION, A CORPORATION OF VIRGINIA.

BATTERY CARRIER AND CONNECTER.

Application filed August 23, 1921. Serial No. 494,539.

*To all whom it may concern:*

Be it known that we, HENRY KOCH, FRIEDRICH H. N. WOHLERS, and WILLIAM NAGLEY, citizens of the United States, residing at Jamaica, in the county of Queens, State of New York, Jamaica, county of Queens, State of New York, and Rahway, county of Union, State of New Jersey, respectively, have invented certain new and useful Improvements in Battery Carriers and Connecters, of which the following is a full, clear, and exact description.

When a number of dry cells have been combined into a portable battery unit, it has been customary to wrap the cells with a sheet of flexible material to form a casing, the terminals of the cells were then connected in a desired order, and the interior of the casing at the terminal end filled with a suitable filler. This entails considerable manual labor, and if a cell proves to be defective the entire unit must be discarded. In the transportation of these units the casing is often damaged between the cells so that the unit must be discarded. It has been proposed to put the cells in a protective and supporting casing from which they could be removed or replaced as desired but the swelling of the sides of the cells and the discharge therefrom when worn out or defective prevented removal of the cells, with the result that these casings had to be discarded with the worn cells.

An object of this invention is to provide an improved carrier and connecter for battery cells which is free of the objections and difficulties heretofore experienced and hereinbefore referred to, which is light in weight, easily grasped to facilitate handling, and attractive in appearance.

A further object is to provide a carrier and connecter in which the cells are connected in the desired order by the mere act of filling the carrier, in which any cell can be separately removed or replaced without removing or discarding the other cells, and which is simple, easily and quickly assembled, and inexpensive. Other objects and advantages will be apparent from the following description of an embodiment of the invention and the novel features will be particularly pointed out in claims.

In the accompanying drawing:

Fig. 1 is an elevation partly in section of a carrier and connecter constructed in accordance with our invention.

Fig. 2 is a plan of the same.

Fig. 3 is a section of the same taken substantially along the lines C C of Fig. 1.

Fig. 4 is a section of the same taken substantially along the line B B of Fig. 1.

Fig. 5 is a section of the same taken substantially along the line A A of Fig. 2, and Fig. 6 is a section of the same taken substantially along the line D D of Fig. 3.

In the illustrated embodiment, the support or casing 1 for the individual batteries or cells 2 comprises a shell of a size and shape to receive the cells side by side, and having in its opposite faces open windows 3 which expose to view a portion of the surfaces of the batteries or cells. The shell is closed by the ends 4 and 5, the end 4 being secured to the shell by pins 6, and the end 5 being movable or removable to permit of the insertion and removal of the cells. The shell is provided with arms 7 which extend inwardly and then upwardly through apertures 8 in the movable end 5. A wing button 9 pivotally secured at its central portion by a screw 10 to the outer face of the end 5 is provided with arcuately extending arms 11 having outwardly facing inclined cam faces thereon which, when the button is rotated, pass into undercut grooves 12 in the arms 7 and cam the end 5 against the shell. Conical coil springs 13 are disposed in shallow depressions 14 in the inner face of the end 4 with their central turns attached to the end 4 by screws 15 and the outer turns free. The springs are each disposed axially of a cell so as to be depressed into its corresponding depression when a cell is inserted and forced downwardly by the closing of the shell by end 5. The springs hold the cells against rattling and yieldingly against the movable end 5 for a purpose to be hereinafter explained. Pins 16 of insulating material project from the end 4 inwardly between the cells to space them from one another, and tubular extensions 17 of insulating material extend inwardly from the movable end 5, in axial alignment with the apertures 8, to also space the cells from one another and protect the arms 7 from electrical contact with the battery cells. The cycylindrical surface of each cell is wrapped in a sheet of suitable covering material so that the cells will present an attractive appearance through the open windows of the shell.

The movable end 5 of the casing is provided upon its inner face with shallow depressions each co-axial with a cell and connected with one another by grooves 19. Shallow metallic pans 20 and $20^a$ are disposed in the depressions 18 with the bottoms of the pans in the bottoms of the depressions, the rims of each pan being rolled over as a rather broad flange to form a contact ring of a size and shape substantially that of the end of the zinc shells $2^a$ of the cells. When the casing is closed by the end 5 the pan flanges are arranged to fit over the ends of the shells of the cells and form electrical contact therewith. An insulating disc 21 is placed in the bottom of each pan, and over each of these discs is placed a contact element 22 of less diameter than the pans and each having a spring-like extension 23 arranged to provide electrical contact with the central electrode $2^b$ of the corresponding battery cell when the casing is closed by the end 5. The contact elements 22 may be formed by stamping and then bending the extension 23 over upon the body part. One of the contact elements 22 such as that in pan $20^a$ is rigidly connected by a conducting strip 24 to the bottom of the next adjacent pan 20, the strip being disposed in the connecting groove 19, and the pan $20^a$, to which it is not connected, having a slot 25 in the rim to permit of the passage of the strip 24 without making electrical contact therewith. The end 5 of the casing is provided with apertures 26, concentric with the pans 20 and $20^a$ in which are tubular terminal contact sleeves 27, whose movements inwardly are arrested by flanges 28 thereon. The pan $20^a$ having the slot 25 therein is electrically and mechanically secured to the aligned sleeve 27 by means of a screw 29 which passes through the bottom of the pan into threaded engagement with the bore of the face of the sleeve. The disc of insulating material in this pan is disposed between the pan and screw, and the axially disposed contact element 22, so as to electrically insulate this element from the aligned sleeve 27. A screw 30 passes through the contact element, disc, and bottom wall of the other pan 20 and is threaded into the bore of the tubular sleeve 27, aligned therewith. The insulating disc in this pan is flanged through the aperture in the bottom of the pan so as to electrically insulate this pan from the aligned sleeve 27 and screw. The screws 29 and 30 serve to secure the pans and contact elements and the tubular terminal contact sleeves in their proper positions and to provide certain of the electrical connections between them. The contact 22 in the pan $20^a$ contacts with the central or positive electrode of the cell over which it is placed and is electrically connected to the pan 20 which contacts with the outer or negative electrode of the next adjacent cell. The contact 22 in the pan 20 engages with the central or positive electrode $2^b$ of the said next adjacent cell, and by the screw 30 is electrically connected to the tubular terminal contact sleeve 27 aligned therewith. The pan $20^a$ through the screw 29 is in electrical contact with the other terminal contact sleeve 27. Thus it will be seen that the cells are connected in series with one another and then to the terminal sleeves 27 by which they can be connected to or disconnected from an external circuit. A small pin 31 projects from the bottom wall of each cavity 18 and each pan is provided with a small aperture to receive the pin so as to be held against rotation thereby. The casing and ends are preferably formed of insulating material, such as hard rubber or other suitable material.

When it is desired to insert new batteries or cells, the wing button 9 is rotated to carry the cam arms 11 out of engagement with the arms 7, whereupon the springs 13 that are carried by the bottom end 4 will shift the battery cells upwardly and move the end 5 upwardly. The removal of the end 5 carries with it the connecters so that the old cells may be one or both removed or replaced with new ones. Because of the open windows 3 in the shell of the casing, any swelling or discharge from the cells, due to their becoming worn out or because of defects which often soon cause them to leak, will not cause them to adhere to the shell of the casing and necessitate the discarding of both shell and casing such as was frequently necessary when closed casings were used. The windows also render the casing lighter, more easily grasped for handling and possible damage to the shells in transportation is largely avoided. After the old cells are removed from the casing, the new ones are inserted with the terminal ends $2^a$ and $2^b$ towards the open end, whereupon the end 5 may be placed upon the shell with the arms 7 passing through the apertures 8, pushed inwardly to shift the cells and compress the springs 13, and the button 9 rotated to cause the arms 11 to move into the undercut grooves of the arms 7 and lock the end 5 to the shell. While the connecters and springs might be interchanged so as to have the connecters upon the immovable end 4 and the springs upon the movable end, the illustrated arrangement is preferred. One or all cells may be replaced as desired with a minimum of time and labor, and the heretofore laborious and expensive procedure of manually soldering the series or parallel connections between the cells and then filling the ends with a filler to protect the connections, is avoided. The cost of replacement of the battery unit with fresh cells is limited to that of the cost of the individual cells. The springs yieldingly press the cells against the connecters at all times so that good electrical contacts are obtained by the mere act of insertion of the individual cells and the closing of the casing or support.

It will be obvious that various changes in the details and arrangements herein described and illustrated may be made by those skilled in the art within the principle and scope of the invention.

We claim:

1. A battery carrier and connecter comprising a casing adapted to receive a plurality of battery cells side by side and having a movable end to permit of the removal or insertion of the cells, pins projecting from the casing slidably through said movable end and having undercut shoulders on their outer ends, securing means mounted on the movable end for movement beneath the undercut shoulders to clamp the movable end to the casing, and connecters adapted to be engaged by the battery cell terminals when the cells are enclosed in the casing, whereby the cells are electrically connected in the desired order.

2. A battery carrier and connecter comprising a casing adapted to receive a plurality of battery cells side by side and having a movable end to permit of the removal or insertion of the cells, pins projecting from the casing slidably through said movable end and having undercut shoulders on their outer ends, securing means mounted on the movable end for movement beneath the undercut shoulders to clamp the movable end to the casing, and connecters adapted to be engaged by the battery cell terminals when the cells are enclosed in the casing, whereby the cells are electrically connected in the desired order, said movable end having inwardly projecting insulating sleeves through which the pins pass for spacing the cells and preventing electrical contact of the pins with the cells.

3. A battery carrier and connecter comprising a casing adapted to receive a plurality of battery cells side by side and having a movable end to permit of the removal or insertion of the cells, pins projecting from the casing slidably through said movable end and having undercut shoulders on their outer ends, securing means mounted on the movable end for movement beneath the undercut shoulders to clamp the movable end to the casing, connecters adapted to be engaged by the battery cell terminals when the cells are enclosed in the casing, whereby the cells are electrically connected in the desired order, and terminal posts on said casing and connected to said connecters for enabling the connection or disconnection of an external circuit to said cells without opening the casing.

4. A battery carrier and connecter comprising a casing adapted to receive a plurality of battery cells side by side and having a movable end to permit of the removal or insertion of the cells, pins projecting from the casing slidably through said movable end and having undercut shoulders on their outer ends, a button mounted for rotary movement on said movable end and having cam shaped arms adapted upon rotation of the button to move beneath the undercut shoulders and clamp the movable end firmly against the casing, and connecters within the casing adapted to be engaged by the battery cell terminals when the cells are enclosed in the casing, whereby the cells are electrically connected in the desired order.

5. A battery carrier and connecter comprising a support adapted to receive a plurality of batteries side by side, a plurality of pan-shaped contact members arranged on said support and against the flanged rim of which the shell rim of a battery abuts in electrical contact, an insulating disc in the bottom of each member, a contact member disposed centrally in each pan-shaped member and against which the central electrode of the corresponding battery abuts, terminal contact posts disposed axially of two pan-shaped members, a connecter between one contact member for each battery and the contact member abutting the opposite electrode of a next adjacent battery, a screw passing between the bottom of the unconnected pan-shaped member and one of the terminal contact posts, and a screw connecting the unconnected central contact member to the other terminal contact.

In witness whereof, we hereunto subscribe our signatures.

HENRY KOCH.
FRIEDRICH H. N. WOHLERS.
WILLIAM NAGLEY.